United States Patent [19]
Mazurkiewicz

[11] Patent Number: 5,527,366
[45] Date of Patent: Jun. 18, 1996

[54] METHOD AND APPARATUS FOR APPLYING HERBICIDES

[76] Inventor: Marian Mazurkiewicz, P.O. Box 1753, Rolla, Mo. 65401

[21] Appl. No.: 241,362

[22] Filed: May 11, 1994

[51] Int. Cl.$^6$ ............................. A01G 1/00; A01G 7/00
[52] U.S. Cl. ........................ 47/58; 47/1.5; 47/1.7; 47/48.5; 47/57.5
[58] Field of Search ................. 47/58, 1.5, 1.7, 47/48.5, 57.5, 57.611, 58.01; 83/22, 177; 71/64.06; 424/1.13, 43; 504/116

[56] References Cited
U.S. PATENT DOCUMENTS 4,748,769  6/1988  Kolskog et al. ..................... 47/1.5

Primary Examiner—David T. Fox
Assistant Examiner—Elizabeth F. McElwain
Attorney, Agent, or Firm—Armstrong, Teasdale, Schlafly & Davis

[57] ABSTRACT

A method of applying herbicide to plants involves delivering a liquid herbicide solution to the plant foliage in a high pressure jet of sufficient energy to physically disrupt the surface of the foliage. The high pressure jet can be either a coherent jet or it can be a stream of droplets. The coherent stream can have sufficient energy to cut the foliage, creating new surfaces that are more wettable by the herbicide solution, and more susceptible to penetration by the herbicide in the solution. The droplets in the droplet stream can be made to be of sufficient size and energy to penetrate the plant tissue, and even to penetrate the plant's cells, thereby speeding uptake of the herbicide by the plant.

9 Claims, 7 Drawing Sheets

METHOD AND APPARATUS FOR APPLYING HERBICIDES

BACKGROUND OF THE INVENTION

This invention relates to a method for applying herbicides for the elimination of weeds and other undesirable plants.

Herbicides are used to eliminate weeds and other unwanted plants. Some types of herbicides are applied to the soil, for uptake by the roots. Other types of herbicides are applied to the plant foliage, typically by spraying. Foliage-applied herbicides are often poorly absorbed; it is difficult for the herbicides to overcome the plant's natural barriers and penetrate into the plant tissue. Moreover, a variety of environmental factors such as light, temperature, humidity, precipitation, and wind can adversely affect uptake of herbicides applied to the surface of foliage. To improve effectiveness, highly concentrated herbicide solutions are used, but this is expensive, and such highly concentrated solutions may adversely affect the environment.

SUMMARY OF THE INVENTION

Generally, the method of applying herbicides according to this invention comprises applying a liquid solution of herbicide in a jet with sufficient energy to physically disrupt the surface of the foliage, breaking down the barriers to the uptake of the herbicide. This is conveniently done through the use of high pressure (in excess of 1000 psi) jets of herbicide solution.

According to one aspect of this invention, high pressure jets of herbicide solution are used to physically cut plant foliage, creating fresh surfaces that are more wettable by the herbicide solution and which are more susceptible to the uptake of the herbicide solution. According to another aspect of the invention, a high pressure jet of herbicide solution disperses into high-energy droplets which are propelled to the surface of the foliage. The droplets impact surface of the foliage, physically disrupting the surface of the foliage, breaking down barriers to the uptake of the herbicide. The herbicide solution can actually be dispersed into microdroplets sufficiently energetic to penetrate the foliage, reaching the intercellular spaces, where the herbicide can be taken up by the cells. The microdroplets can even act on a cellular level penetrating directly into the cells. The degree of physical disruption of the foliage can be easily controlled by controlling the energy of the high pressure jet of herbicide solution, and the disruption can be made so extensive that the disruption of the foliage contributes to the death of the plant.

The process of this invention can be conveniently carried out with a pump that pumps a liquid herbicide solution under high pressure through a small-orifice nozzle. This nozzle can be sized and configured to produce a coherent stream for cutting plant foliage. Alternatively, the nozzle can be sized and configured to disperse the herbicide solution into droplets, and preferably microdroplets. By manipulating pressure, nozzle shape and size, and the stand-off distance between nozzle and the target foliage, the energy and effect of the high pressure stream of herbicide solution can be controlled to achieve the desired effect for a given type of foliage. A high pressure coherent stream of herbicide solution can easily be created to cut foliage, creating new surfaces through which the herbicide is more readily absorbed. Alternatively, a high pressure stream of droplets of herbicide solution can be created which can physically disrupt the surface of the foliage, facilitating absorption through the surface of the foliage. The droplets can even be created of sufficiently small size yet sufficient energy to penetrate the plant tissue, reaching the intercellular spaces where the herbicide can be uptaken by the cells, or even penetrating directly into the cells.

Because of the disruption of the foliage's protective structures from the high pressure jet of either a coherent stream or a stream of droplets, the introduction and uptake of the herbicide is faster. This not only allows the herbicide to work faster, but it allows the use of less concentrated herbicides solutions which is more economical and more environmentally sound. Furthermore, the physical disruption of the plant augments the effect of the herbicides.

These and other features and advantages will be in part apparent, and in part pointed out hereafter.

DETAILED DESCRIPTION OF THE PREFERRED EMBODIMENT

The method of applying herbicides to plants according to the present invention involves the application of a liquid solution of herbicides in a high pressure jet of sufficient energy to physically disrupt the surface of the foliage, breaking down barriers to the uptake of the herbicide. The high pressure jet can be a coherent jet of herbicide solution which cuts the foliage, exposing new surfaces that are susceptible to the uptake of the herbicide in the solution. The high pressure jet can also be a jet of droplets that impact the surface of the foliage, physically disrupting the surface. The disruption of the surface improves the wetting characteristics of the surface. Moreover, it is easier for the herbicide to penetrate the surface in the physically disrupted areas. The droplets can easily be made of sufficiently small size yet with sufficient energy to directly penetrate the surface, into the intercellular spaces where the herbicide can be taken up into the cells. The droplets can even be made of sufficient size and energy to penetrate directly into the cells of the plant. In addition to more quickly and efficiently introducing the herbicide into the plant, the high pressure jets contribute to the destruction of the plant through the physical disruption of the plant.

Figure 1:
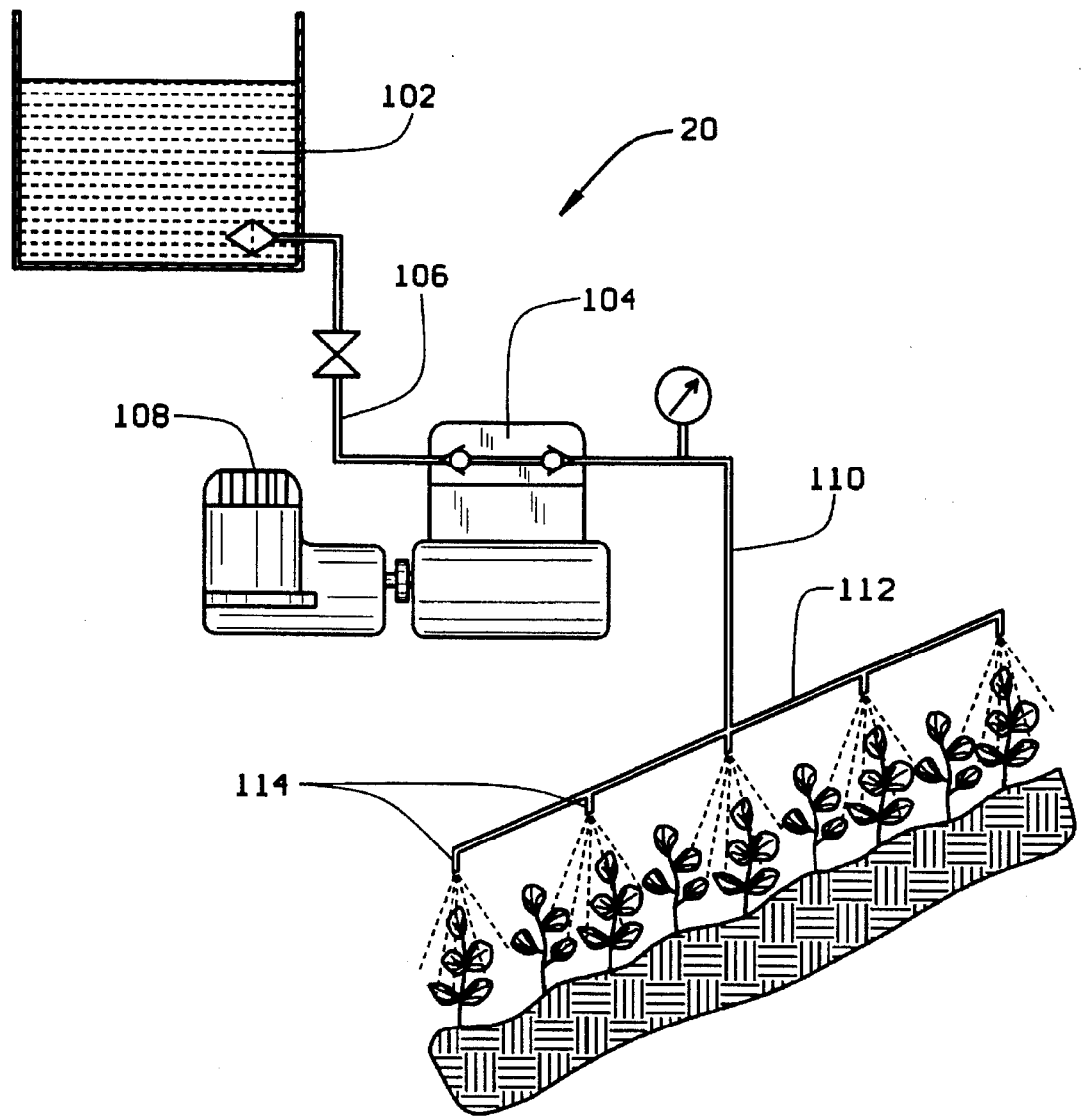
FIG. 1 is a schematic view of a system for dispensing a herbicide solution into a high pressure jet and applying the herbicide to foliage.

An apparatus for carrying out the method of the invention is indicated generally as 20 in FIG. 1. As shown in FIG. 1, a tank 102 of a liquid herbicide solution is connected to pump 104 via line 106. The pump 104, driven by a motor 108, draws the herbicide solution from the tank 102 through line 106, and delivers the herbicide solution under high pressure (in excess of 1000 psi) to line 110. The line 110 extends to a manifold 112 which has a plurality of high pressure nozzles 114.

The design of high pressure nozzles is a well established art, and it is well-known how to select a nozzle design that will deliver a jet in a coherent stream or in a stream of high energy droplets. According to one aspect of this invention, the nozzles 114 deliver jets in a coherent stream of sufficient energy to physically cut the foliage. The cut foliage has new surfaces that are more susceptible to the penetration of the herbicide in the solution. In addition, the physical disruption of the cutting facilitates the destruction of the plant. Jets sufficiently powerful to cut multiple layers of leaves and stems have been created.

Figure 2:
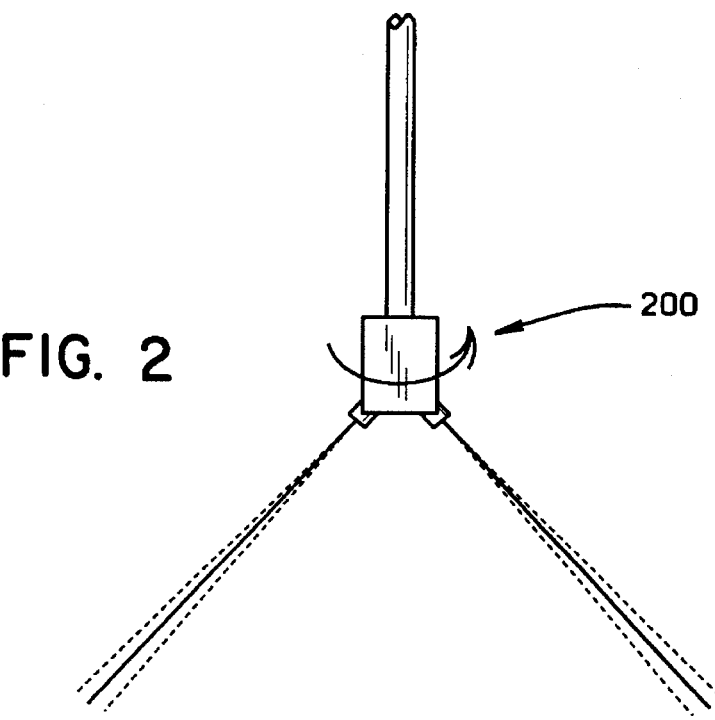
FIG. 2 is a side elevation view of a twin rotating jet nozzle.
Figure 3:
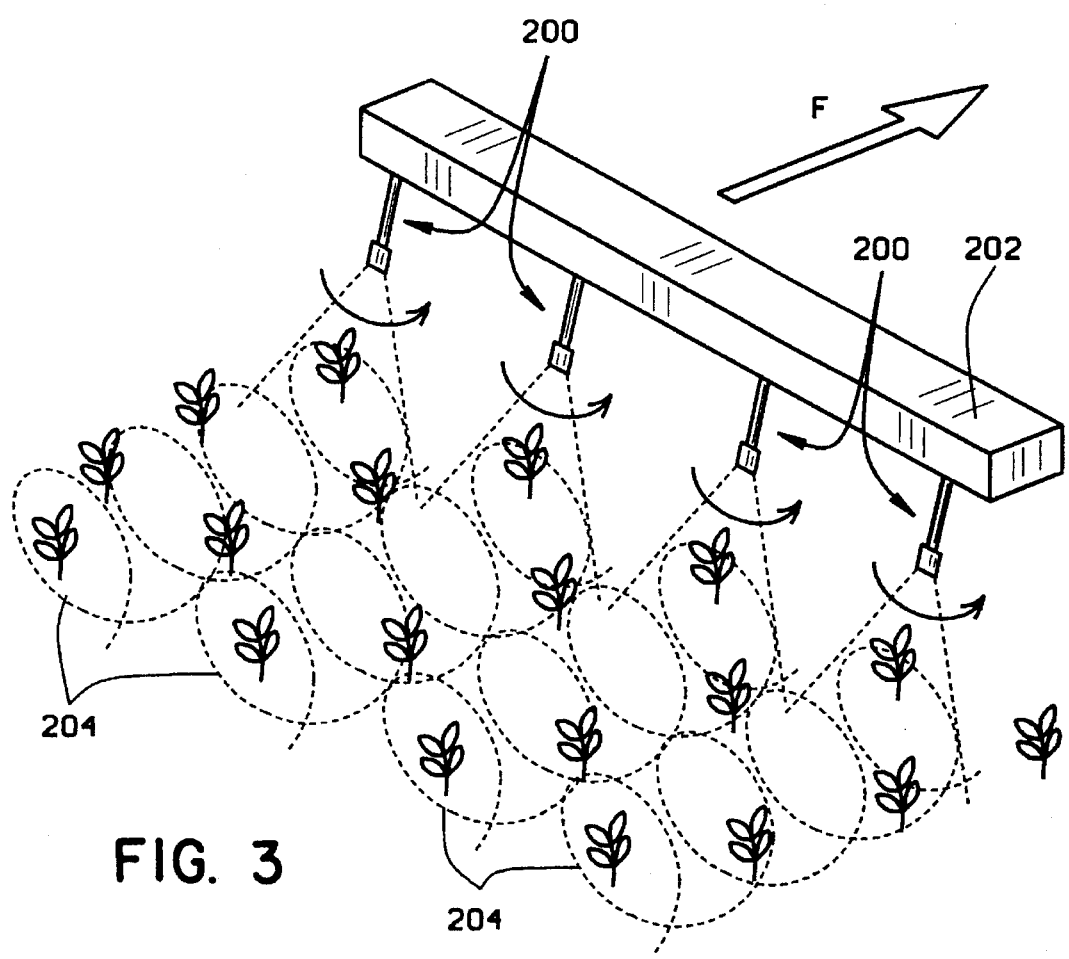
FIG. 3 is a perspective view of four twin rotating jet nozzles mounted on a boom.

FIG. 2 is a schematic drawing of a single rotating high pressure jet head 200, capable of delivering twin high pressure jets. FIG. 3 is a schematic drawings of four such heads 200 mounting on a boom 202. The boom traverses a field in direction F, and the speed of forward motion, and the speed of rotation of the head is selected to achieve the desired extent of cutting of the plants. Lines 204 illustrate the overlapping pattern of the high pressure jets, which achieve substantially complete coverage of the plants as illustrated in the example below.

In a high pressure coherent jet application, typical water pressure might range from about 1,000 psi to about 30,000 psi (about 6.9 MPa to about 207 MPa); nozzle diameters might range from about 0.005 in. to about 0.040 in. (about 0.125 mm to about 1.0 mm); stand-off distances might range from about 1 in. to about 40 in. (about 2.54 cm to about 92 cm); and sprayer speed might range from about 0.1 mph to about 10 mph (about 0.161 km/h to about 16.1 km/h).

EXAMPLE

A nine foot boom with three twin revolving heads transverses a field at 3 mph. The water pressure is at 10,000 psi, each nozzle diameter is 0.018 inches, and the stand-off distance is 3 feet. The boom covers 2.375.1 ft²/min. The boom takes 18.1 minutes to cover an acre, applying 108 gallons per acre. At a rotation speed of 1000 rpm, jet cuts will be every 1.5 inch.

According to another aspect of this invention, the nozzles deliver jets of high energy droplets, dispersing the herbicide solution into droplets and propelling these droplets toward the foliage. The size and energy of the microdroplets is a function of the shape and size of the nozzle 114 (FIG. 1), the pressure of the herbicide solution achieved by the pump 104 (FIG. 1), and the stand-off distance between the nozzles and the foliage.

Figure 4:
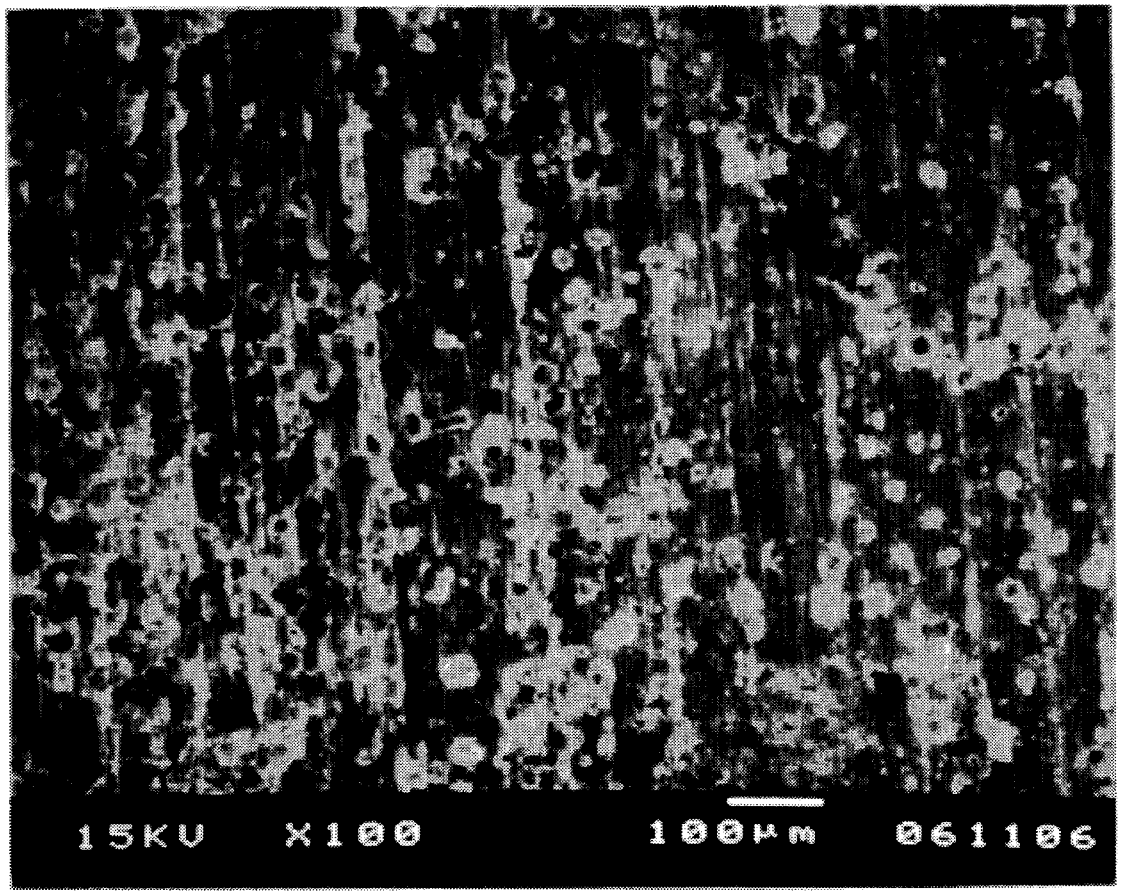
FIG. 4 is a photomicrograph of a lead sheet that was subjected to a high pressure jet of microdroplets.

FIG. 4 is a photomicrograph at 100× magnification of a lead sheet that has been impacted by microdroplets. FIG. 4 shows impact craters from microdroplets ranging in size from about one to about ten microns that were sufficiently energetic to penetrate the surface of the lead. This demonstrates that it is well within the ability of the high pressure liquid jet art to produce droplets of sufficient size and energy to penetrate the surface of foliage, and even to penetrate individual plant cells.

Figure 5:
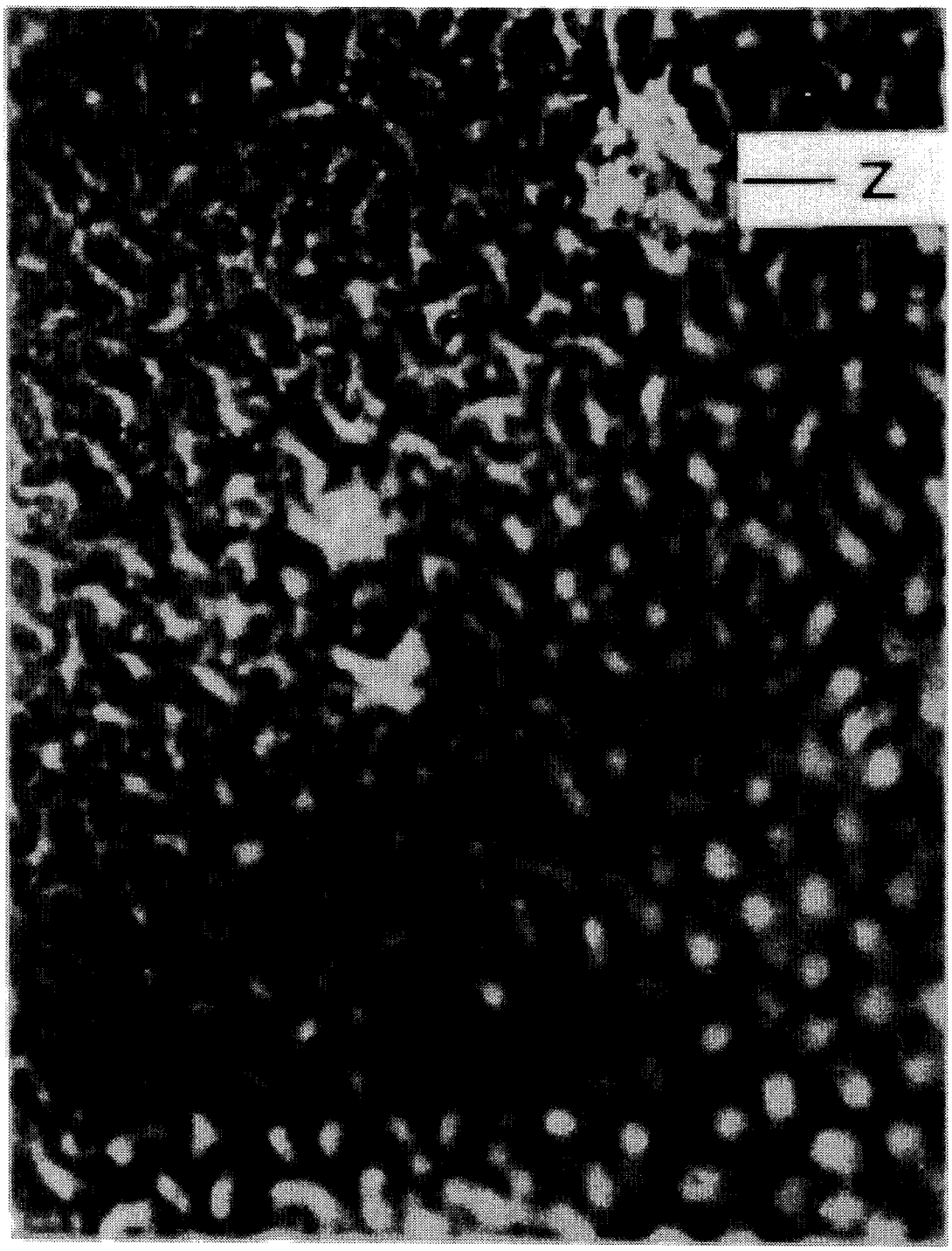
FIG. 5 is a photomicrograph of a leaf after exposure to a high pressure jet of droplets, showing areas of surface disruption.

FIG. 5 is a photomicrograph of a leaf at 30× showing zones Z where the surface has been disrupted by droplets from a high pressure stream in accordance with this invention.

Figure 6:
FIG. 6 is a photomicrograph of a leaf before exposure to a high pressure jet of droplets.
Figure 7:
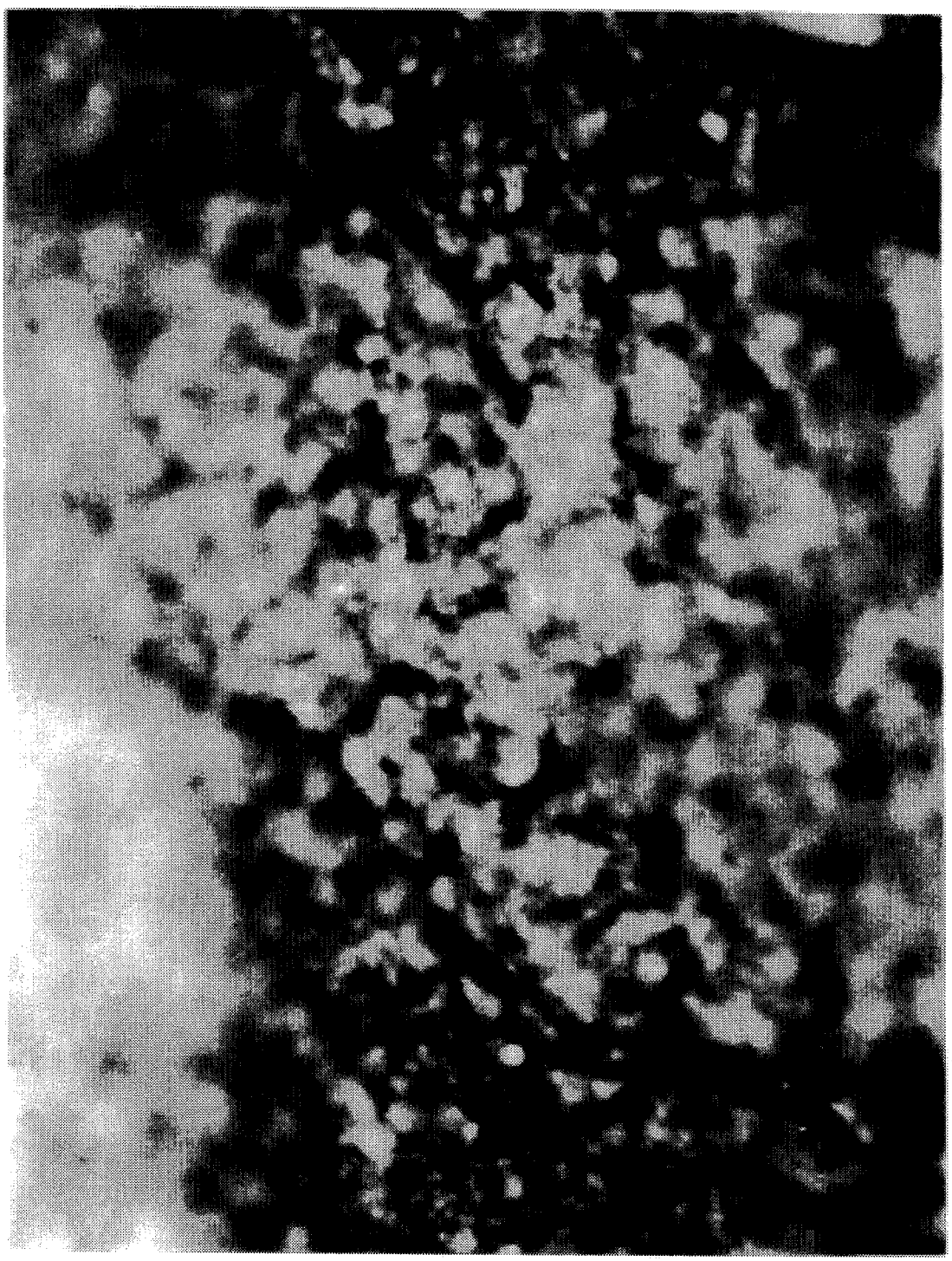
FIG. 7 is a photomicrograph of a leaf after exposure to a high pressure jet of droplets.

FIGS. 6 and 7 are photomicrographs at 60× of the surface of a leaf before and after exposure to a high pressure jet of droplets in accordance with this invention. FIG. 6 shows that before the application of the high pressure jet, the leaf has a well developed surface topology. FIG. 7 shows that after the application of the high pressure jet, the surface of the leaf is physically disrupted with the structure of the surface of the leaf changed.

Figure 8:
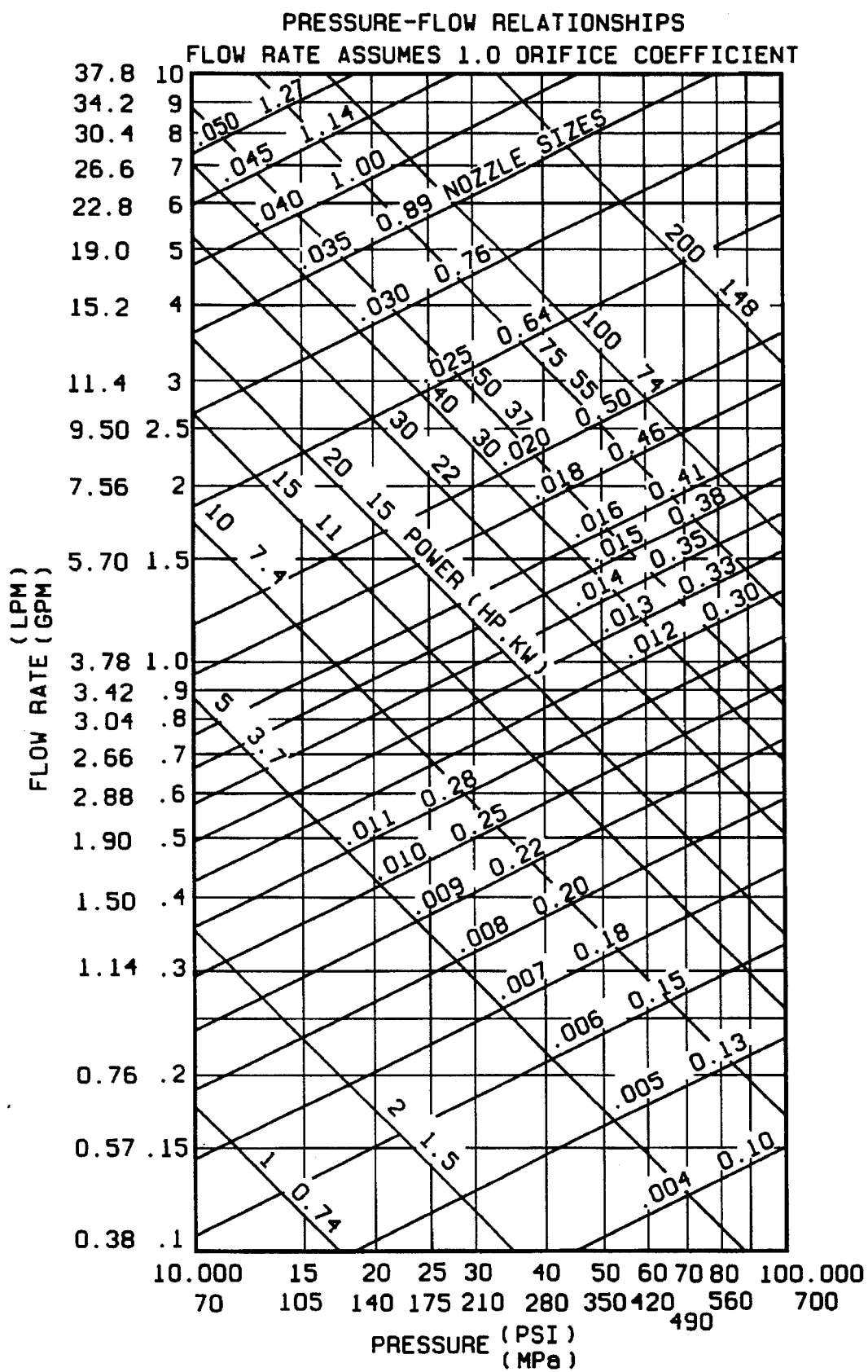
FIG. 8 is a standard chart illustrating the relationship between pressure and flow rate for a variety of nozzle orifice sizes.

The FIG. 8 chart illustrates the ability to control the size and energy power of a high pressure jet stream for a particular nozzle configuration. Nozzle shape is another factor that can be used to selectively control microdroplet size and energy. Finally, the stand-off distance between the nozzle and the target foliage can be controlled to control microdroplet size and energy.

For a typical microdroplet application, typical solution pressures might range from abut 5,000 psi to about 30,000 psi (about 34.5 MPa to about 207 MPa); the nozzle diameter might range from about 0.005 in. to about 0.040 in. (about 0.125 mm to about 1.0 mm); stand-off distance might range from 0 inches to about 12 inches (about 0 cm to about 25.4 cm); and sprayer speed might range from about 0.1 mph to about 10 mph (about 0.161 km/h to about 16.1 k/n/h).

What is claimed is:

1. A method of applying herbicide to plants comprising the steps of delivering a liquid herbicide solution to the plant foliage in a high pressure jet of sufficient energy to physically disrupt the surface of the foliage.

2. The method according to claim 1 wherein the high pressure jet is a coherent jet.

3. The method according to claim 2 wherein the jet has sufficient energy to cut the foliage, creating new surfaces that are susceptible to the penetration of the herbicide in the solution.

4. The method according to claim 1 where the high pressure jet is a stream of droplets.

5. The method according to claim 4 wherein the droplets are of sufficient size and energy to penetrate the plant tissue.

6. The method according to claim 5 wherein the droplets are of sufficient size and energy to penetrate the plant cells.

7. The method according to claim 1 wherein the jet has a pressure of at least 1000 psi.

8. A method of applying herbicide to plants comprising the step of delivering a liquid herbicide solution to the plant foliage in a high pressure jet of sufficient energy to physically disrupt the surface of the foliage sufficient to increase the susceptibility of the surface to the penetration by the herbicide in the solution.

9. A method of applying herbicide to plants comprising the step of delivering a liquid herbicide solution to the plant foliage in a high pressure jet of sufficient energy to physically disrupt the surface of the foliage sufficient to increase wettability of the surface by the herbicide solution.

\* \* \* \* \*